United States Patent [19]

Ochoa

[11] Patent Number: 5,072,764
[45] Date of Patent: Dec. 17, 1991

[54] PNEUMATIC METHOD AND APPARATUS FOR SEATING TUBELESS TIRES

[75] Inventor: Sandy Ochoa, Ruidoso Downs, N. Mex.

[73] Assignee: Tire Service Equipment Mfg. Co., Inc., Phoenix, Ariz.

[21] Appl. No.: 605,125

[22] Filed: Oct. 20, 1990

[51] Int. Cl.$^5$ ............................................. B60C 25/06
[52] U.S. Cl. ...................................................... 157/1.1
[58] Field of Search ................. 187/1, 1.1, 1.2; 222/3, 222/631

[56] References Cited

U.S. PATENT DOCUMENTS

| | | | |
|---|---|---|---|
| 3,552,469 | 1/1971 | Corless | 157/1.1 |
| 3,675,705 | 7/1972 | Corless | 157/1.1 |
| 3,683,991 | 8/1972 | Ruthland et al. | 157/1.1 |
| 3,866,654 | 2/1975 | Duquesne | 157/1.1 |

OTHER PUBLICATIONS

The McGee Company, Catalog, "Bead Seating Systems," p. 72.

Primary Examiner—James G. Smith
Attorney, Agent, or Firm—Edward C. Jason

[57] ABSTRACT

A method and apparatus for seating tubeless tires, particularly large tubeless truck tires, on a rim. A tank having a volume related to the internal volume of the largest tire to be seated is charged with compressed air at a pressure which is within the range of pressures considered safe for general purpose vehicular applications. A discharge barrel having an internal passage with an area of from 8 to 20 square centimeters is disposed between the tank and the bead of the tire and positioned so that air discharged therefrom strikes the bead from a direction roughly perpendicular to the plane of the bead. An approximately full-flow valve, positioned in flow control relationship to the barrel, is opened abruptly to direct a pneumatic pulse having a fast-rising leading edge against the bead. The bead then seats on the rim as a result of the combined effect of the motion imparted thereto by the impact of the pulse and the air injected into the tire in connection with that impact.

19 Claims, 2 Drawing Sheets

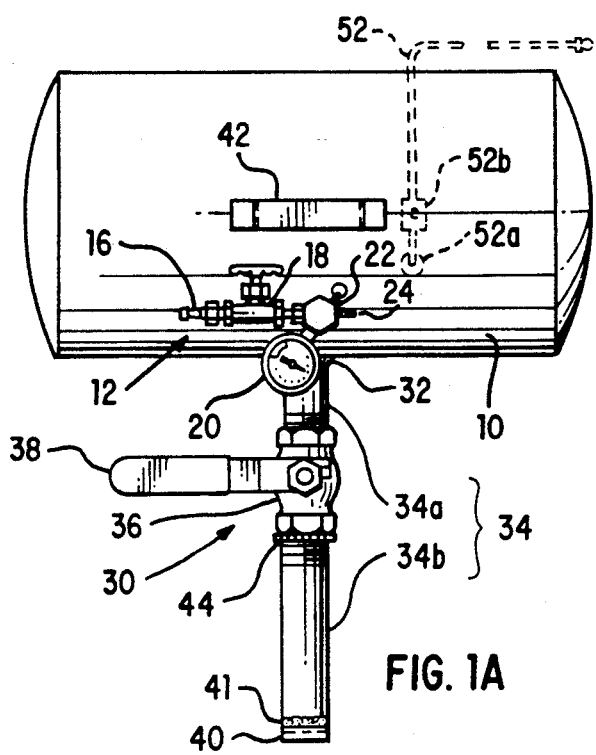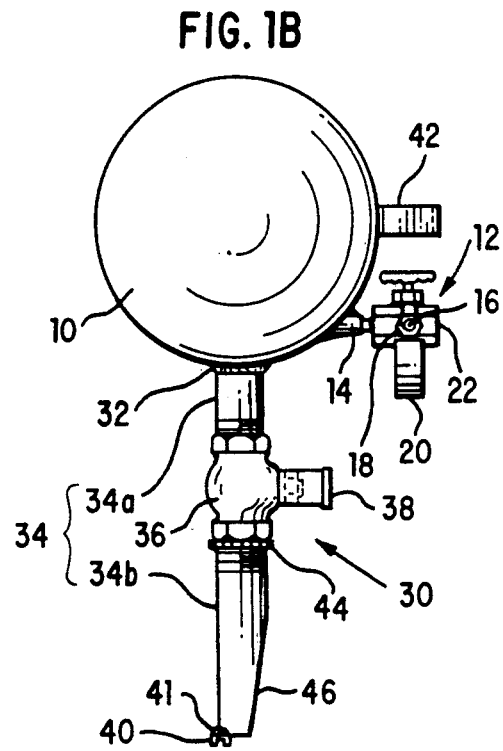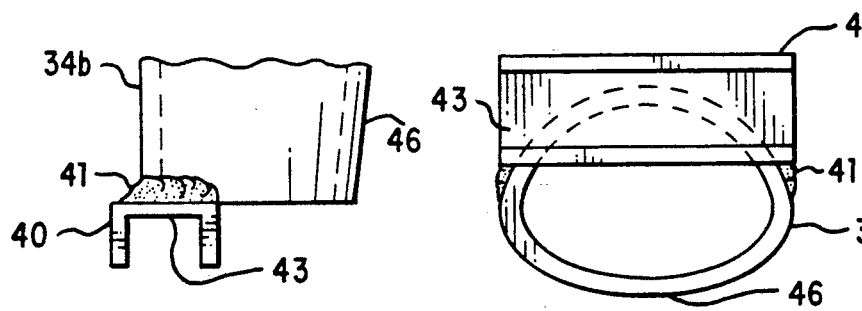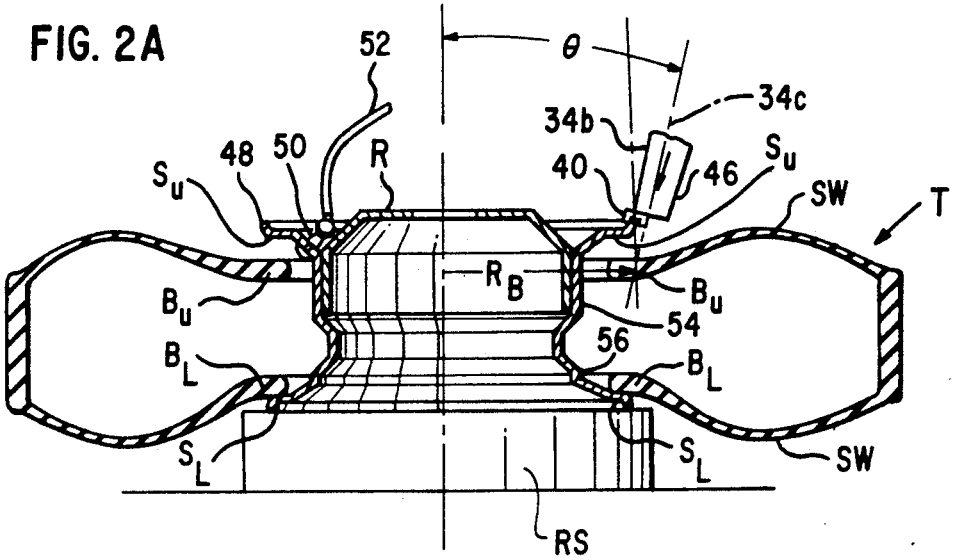

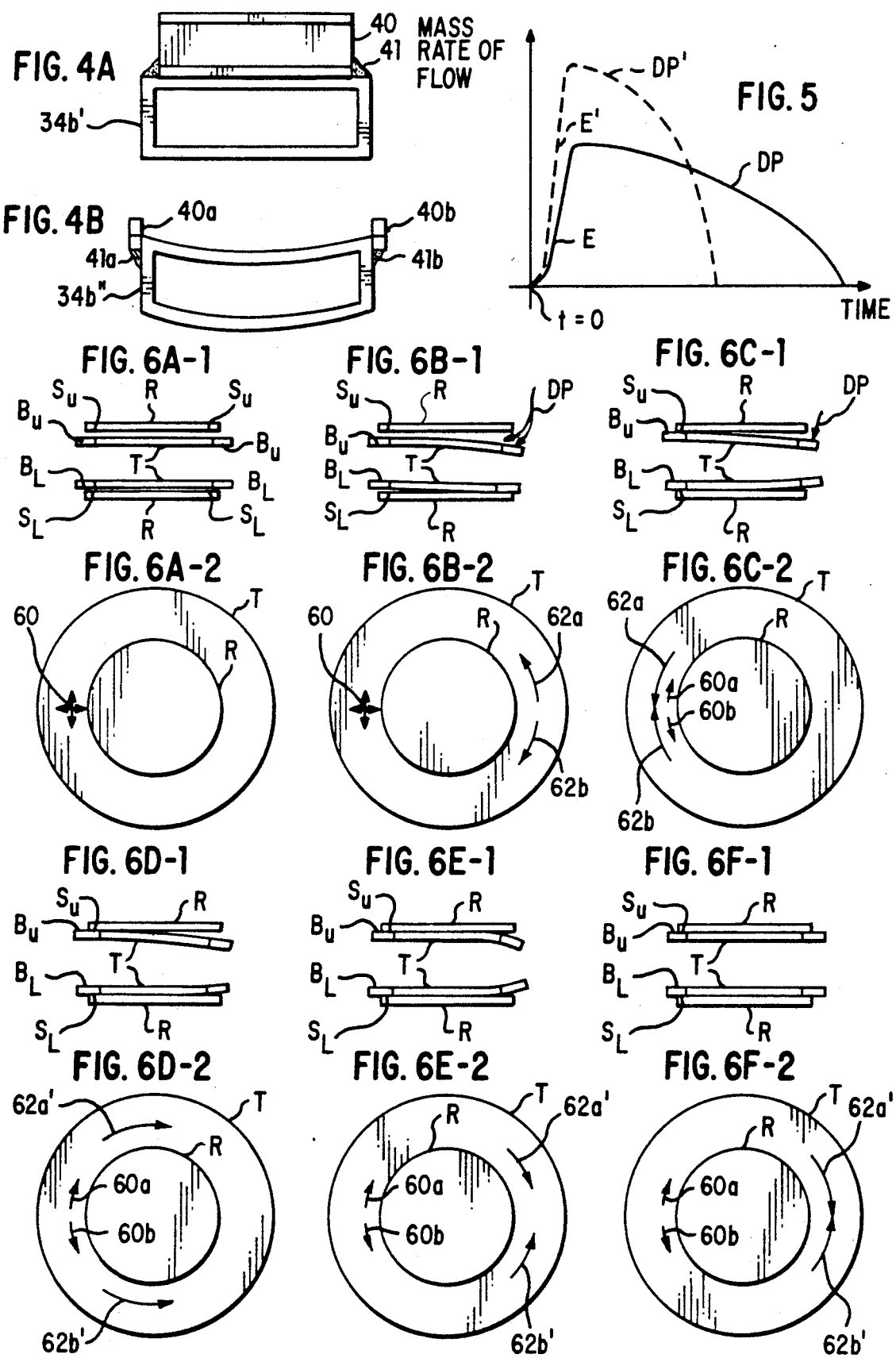

1

PNEUMATIC METHOD AND APPARATUS FOR SEATING TUBELESS TIRES

BACKGROUND OF THE INVENTION

The present invention relates to an improved method for establishing an airtight seal between the bead of a tubeless tire and a rim, and to an apparatus specially adapted to practice that method. More particularly, the present invention is directed to a bead seating method and apparatus which employs a pneumatic pulse having a leading edge with a short rise time both to impart momentum to the bead and inject air into the tire, and thereby initiate a bead motion which results in the progressive seating thereof.

One of the chief difficulties associated with the changing of tubeless tires is the difficulty of establishing the initial airtight seal between the bead of the tire and the bead-seating surface of the rim on which it is to be mounted. This difficulty results from the fact that, when a tire is uninflated, the open space or gap between its bead and the bead-seating surface of the rim is often so large that seating is prevented by the leakage of air therethrough. The problem is that, at the same time that a large gap renders the tire unable to hold air, the inability of the tire to hold air prevents it from expanding so as to reduce the size of the gap. This problem is most serious in the case of heavy truck tires, particularly radial truck tires, because the stiffness of such tires makes them resistant to forces that tend to reduce the gap sufficiently for seating to occur.

Prior to the present invention a number of different tools have been developed in an attempt to solve the above described problem. One class of such tools, which are best described as mechanical, although they may include some pneumatic elements, rely on the use of flexible straps or segmented hoops which squeeze the tire along the circumference of its tread and thereby force its bead upward toward the bead-seating surface. On example of an apparatus of the former type is described in U.S. Pat. No. 3,578,059, issued to J. Uhen on May 11, 1971. An example of the latter type is described in copending U.S. patent application Ser. No. 07/511,322, filed on Apr. 19, 1990, by S. Ochoa, the inventor of the present invention.

Another class of such tools, which are best described as pneumatic, although they include some non-pneumatic elements, rely on the injection of a narrow jet or on a circular curtain of high pressure air between the bead and the bead-seating surface. One example of a pneumatic seating tool of the former type is described in U.S. Pat. No. 3,866,654, issued to V. Duquesne on Feb. 18, 1975. Examples of pneumatic seating tools of the latter type include U.S. Pat. Nos. 3,522,469, issued to L. Corless on Jan. 5, 1971, and 3,683,991, issued to F. Ruhland et al. on Aug. 15, 1972.

While pneumatic seating tools of the above-mentioned types are able to seat many of the more easily seated types of tires, such as automobile tires, they have limitations or disadvantages which prevent their being used successfully on heavy truck tires or on tires that are badly collapsed, i.e., which have unusually large tire-rim gaps when in their uninflated condition. For pneumatic seating tools of the type which inject a circular curtain of air into the tire-rim gap, one of these is that their structure inherently limits their use to tires of a single size. This is because the diameter of the curtain of air must match the diameter of the bead of the tire. Another of these is that their method of operation limits their use to tires which have a horizontal orientation. This is because only a horizontal orientation allows the weight of the tire to produce the symmetrical tire-rim gap which allows air to enter that gap from all directions at once. Finally, such tools may require the use of air pressures which far exceed the pressure (125 psi) that is considered to be the safe maximum for general purpose vehicular applications.

Pneumatic seating tools of the type which inject a narrow jet of air into the tire-rim gap exhibit a different but equally limiting range of disadvantages. One of these is that they often fail to seat tires which are heavy or badly collapsed, even when the tires have the orientation (i.e., horizontal) in which they are most easily seated. Another is that the highest probability of a successful seating is achieved when the injection nozzle is positioned between the tire and the rim, a position which can easily cause the nozzle to be trapped therebetween, thereby preventing the seating process from running to completion. Finally, such tools may also require the use of pressures which exceed those considered safe for general purpose vehicular applications.

SUMMARY OF THE INVENTION

In accordance with the present invention there is provided a method and apparatus for seating tubeless tires which utilizes a dynamic seating action not contemplated by the prior art, and which is therefore not subject to the limitations and disadvantages thereof. More particularly, the present invention contemplates not simply using a flow of compressed air to push all parts of the bead against the bead-seating surface more or less simultaneously, but rather using a single high energy pulse of air to produce a bead motion and internal pressure wave which cooperate to cause the contact between the bead and the rim to progress dynamically from one end of the bead to the other. In other words, the present invention employs a bead-seating action which is dynamic and progressive rather than static and simultaneous.

Generally speaking, the method aspect of the present invention contemplates the following steps: (a) accumulating a mass or charge of air at a predetermined elevated pressure within a predetermined volume; (b) providing between said volume and the tire a discharge conduit or barrel having a flow cross-section many times larger than that of general purpose air hoses; (c) positioning the barrel so that air emerging therefrom is directed or channeled primarily at a single location near one edge of the bead; and (d) abruptly releasing the charge of air against that location through said barrel. By performing these steps, the present invention produces a single high energy pulse or pellet of air which is capable both of transferring a large amount of momentum to the bead and of injecting a fast-moving mass of air into the tire. Together, the resulting bead motion and mass of air produce a dynamic seating action which is so powerful that even heavy or collapsed tires are seated, more quickly than the human eye can easily see, without regard to the orientation of the tire.

The present invention also contemplates a novel apparatus or tool which is specially adapted to carry out the above-summarized method. Generally speaking, this apparatus includes: (a) a tank capable of storing a predetermined volume of air at a predetermined elevated pressure; (b) a discharge barrel, having an internal passage with a flow aperture or cross-section of from approximately 8-20 square centimeters, for channeling or focussing the discharge of air from the tank, (c) (preferably) a positioning element attached to or formed from the end of the barrel for holding the barrel in a predetermined position with respect to the bead of the tire; and (d) a quick-release, approximately full-flow valve for initiating the discharge of air from the tank through the barrel. Together these elements comprise what may be termed a pneumatic gun that is specially adapted to fire the single high energy pellet of air that produces the above mentioned progressive seating action.

In the preferred embodiment the tank of the invention is provided with a charging assembly which includes a pressure gage for showing the pressure within the tank, an inlet fitting adapted for connection to the outlet fitting of a general purpose pneumatic hose, and a shut-off valve. This assembly allows the apparatus of the invention to be charged from any convenient source of compressed air and then disconnected therefrom. Because the fully charged tool need not be connected to the compressor at the time it is used, and does not require any energy source (except for the potential energy of the compressed air stored in the tank) or prime mover, it is light in weight (e.g. 10 kilograms), portable and self-contained. It may therefore be charged at any location equipped with a compressor and then carried by hand to the roadside or field where it is to be used.

As in the case of all pneumatic seating tools, the seating tool of the invention is ordinarily used with a tire that is supplied with a steady flow of inflating air that is introduced through a valve stem mounted on the rim. This inflating air is not necessary for the seating of the tire on the rim, but is helpful in maintaining the seat once it is established. In the event that no other source of such inflating air is conveniently available, the tank of the invention may be provided with an additional outlet line and push button valve which allows this air to be drawn from the tank just prior to the time the tank is discharged. Alternatively, such inflating air may be provided from a can of compressed air of the type which is commercially available for this purpose. In either case, the result is to make the seating tool of the invention fully self-contained, i.e., usable at locations far from any compressor, electrical outlet, or prime mover.

DESCRIPTION OF THE DRAWINGS

Other objects and advantages of the method and apparatus of the invention will be apparent from the following description and drawings in which:

FIGS. 1A and 1B are respective front and side views of the preferred embodiment of the apparatus of the present invention;

FIGS. 2A and 2B are respective enlarged fragmentary side and bottom views of the lower end portion of the embodiment of FIGS. 1A and 1B;

FIG. 3 is a cross-sectional view of a tire and rim which shows the relationships thereof to the outlet portion of the embodiment of FIGS. 1 and 1B;

FIGS. 4A and 4B comprise views of alternative embodiments of the structure shown in FIG. 2B;

FIG. 5 is a diagram showing the mass rate of flow of air from the tank of FIGS. 1A and 1B as a function of time;

FIGS. 6A-1 through 6F-1 are simplified fragmentary side views showing the relative positions of the bead of a tire and the bead-seating surface of a rim at respective instants during the bead-seating process contemplated by the present invention; and FIGS. 6A-2 through 6F-2 are simplified plan views showing the magnitudes and directions of the currents of air flowing in the interior of the tire at the times depicted in FIGS. 6A-1 through 6F-1, respectively.

DESCRIPTION OF THE PREFERRED EMBODIMENTS

Referring to FIGS. 1A and 1B, there are shown respective front and side views of the preferred embodiment of the seating apparatus of the present invention. In the embodiment of FIG. 1 this seating apparatus includes a steel air storage tank 10 which is capable of storing air at the elevated pressures normally considered safe for general purpose motor vehicle service applications, i.e., pressures of a maximum of 125 psi. Tank 10 may be of the type used in the air brake systems of trucks and typically has a storage capacity or volume of 6 gallons (approximately 23 liters). As will be explained more fully later, however, the optimum value for the volume of tank 10 is related both to the size of the tire to be seated and to the pressure of the air stored therein.

The seating tool of FIG. 1 also includes a tank inlet or charging assembly 12 which is connected to a tank inlet 14 and through which tank 10 may be charged to the desired operating pressure from a compressor (not shown). Inlet assembly 12 includes a pneumatic coupling 16 of the type commonly used with general purpose pneumatic hoses, a shut-off valve 18, and a pressure gage 20, all of which are connected to inlet 14 through a suitable manifold 22. Inlet assembly 12 also preferably includes an overpressure safety valve 24. In operation, inlet assembly 12 allows tank 10 to be connected to a compressor for charging to the desired operating pressure, and then disconnected therefrom after the closure of valve 18. This charging structure and procedure is significant for purposes of the present invention because it makes it possible for the seating tool to be charged at a location where a compressor is available, then disconnected therefrom and used at a remote location, such as a roadside or field, where no compressor, energy source or prime mover is available. In other words, this charging structure and procedure is responsible for the fact that the seating tool of the invention is both portable and self-contained.

The seating tool of FIG. 1 also includes a tank outlet or discharging assembly 30 which is connected to a tank outlet via a weld 32 and through which tank 10 may be discharged to initiate the seating action of the present invention. Discharging assembly 30 includes a discharge conduit or barrel 34, here shown as relatively large diameter pipe that includes upper and lower sections 34a and 34b, a sudden release valve 36 having a manually operable handle 38, and a positioning member 40.

When valve 36 is open, the internal passage or port therethrough, together with the internal passages through conduit sections 34a and 34b and the tank outlet, define a tank discharge path having a flow aperture or cross-section sufficiently large that the flow resistance presented thereby is several or even many times smaller than that of general purpose pneumatic hoses. This low flow resistance is important to the result contemplated by the present invention because it allows the tank to discharge rapidly to produce what may be visualized as a directed or channeled explosion of the mass of air stored in tank 10.

In a typical embodiment, intended for use with a truck tire having a rim diameter of 24.5 inches (62.2 cm), for example, pipe 34 preferably has an inside diameter of 1½ inches (3.8 cm), resulting in a flow aperture of 1.77 in$^2$ (11.4 cm$^2$). General purpose pneumatic hoses, by contrast, have inside diameters that range from ⅜ inch (0.95 cm) to ¾ inch (1.9 cm), resulting in flow apertures of from 0.11 in$^2$ (0.71 cm$^2$) to 0.44 in$^2$ (2.8 cm$^2$). The large flow aperture contemplated by the present invention is important since it assures that tank 10 may be discharged rapidly to produce a single pulse of air (See FIG. 5) which has a fast rise-time and a brief duration, but which is able to deliver both a large amount of momentum and a large mass of air. In accordance with the invention, the large momentum carried by this discharge pulse assures that a large quantity of momentum may be imparted to the bead of the tire, while the large mass of the air making up the discharge pulse assures that a large quantity of fast moving air may be injected into the interior of the tire. As will be explained more fully in connection with FIGS. 6A-1 through 6F-2, the last mentioned properties cooperate to produce the progressive dynamic seating action contemplated by the invention.

It will be understood that, so long as a tire of a given size is supplied with a sufficient quantity of momentum and a sufficient mass of air, there is a certain latitude in the size of the flow aperture afforded by the tank discharge path. For the above-mentioned 24.5 inch truck tire, for example, the inside diameter of pipe 34 may be as small as 1¼ inches (3.2 cm), yielding a flow aperture of 1.25 in$^2$ (8 cm$^2$), or as large as 2 inches (5.1 cm), yielding a flow aperture of 3 in$^2$ (20.4 cm$^2$). The lower of these limits is fixed by the fact that for a given pipe length, smaller dimensions limit both the rise-time and mass rate of flow of the discharge pulse. The upper of these limits is fixed by the fact that larger dimensions tend to cause the discharge pulse to impart an undesirably large quantity of momentum to the sidewall of the tire, thereby introducing undesired components into the motion of the bead of the tire.

In addition, there is a certain latitude in the size of tank 10. For a 24.5 inch truck tire, for example, a tank having an internal volume of 6 gallons (23 liters) is adequate, provided that a sufficiently high tank pressure is used. A larger or smaller tank may however be used with smaller or larger tires, at the same pressure, or a single size tank may be used at different pressures. This is because there is a certain degree to which tank volume and pressure can be traded off against one another, without changing the total amount of potential energy stored in the tank. As a general rule, however, the volume and pressure of the compressed air in the tank should be such that, if it were measured under conditions of standard temperature and pressure (STP), it would have a volume larger than the internal volume (the volume without regard to pressure) of the tire to be seated. A 6 gallon tank charged to a pressure of 125 psi, for example, contains approximately 193 liters of air at STP, while a 24.5 inch tire has an internal volume (when inflated) of approximately 110 liters (computed by using the dimensions of a toroid of similar size).

Moreover, an increase in the tank pressure can be offset to some degree by a decrease in the flow aperture of the discharge path or of the tank volume and vice-versa. It will therefore be understood that the above-mentioned specific values for these parameters are representative values for a 24.5 inch truck tire and that appropriate adjustments and tradeoffs may be desirable to optimize the seating tool for smaller or larger tires. Alternatively, these parameters may simply be chosen to accommodate the largest tire to be seated, thereby eliminating the need for seating tools of different sizes at the expense of a degree of overcapacity or inefficiency when used with smaller tires.

In the embodiment of FIG. 1 valve 36 comprises a ball valve which has an internal flow aperture or port which is approximately equal to that of barrel 34, i.e., at least roughly approximates a full-flow valve. Valve 36, for example, would ideally have a 1½ inch internal port when used with a 1½ inch pipe, but may be replaced with a similar valve having a 1¼ inch port if the tool has enough extra stored potential energy to compensate for the resulting increase in the pressure drop across the port. Such a replacement may well be desirable from a cost standpoint because the cost of a ball valve increases roughly with the square of its internal port size.

Because the present invention contemplates a discharge pulse with a fast-rising leading edge, valve 36 is preferably a valve of the type which may be opened abruptly, i.e., a quick-release valve. This quick-release action may be produced by simply operating handle 38 of valve 36 with a rapid motion of the hand. It may also be produced by utilizing a valve with an inherently faster action, such as a gate valve. Increases in the rate of valve opening may also be produced by using more complex valves such as spring or power actuated valves that needed only be triggered into operation. It will be understood that all such valves and their equivalents are within the contemplation of the present invention.

To the end that the seating tool of FIG. 1 may be supported in a convenient position during operation, tank 10 is provided with a handle 42 and lower barrel section 34b is provided with a threaded locking ring 44. The latter ring is threadedly engaged with the same threads that hold barrel section 34b to the housing of valve 36. This allows barrel section 34b to be rotated about its longitudinal axis, while ring 44 is loose, thereby allowing positioning member 40 to be fixed in any desired rotational position with respect to tank 10. This, in turn, allows the user to use the seating tool while holding it either in front of or to one side of the tire. It will be understood that a similar locking ring may be positioned between upper barrel section 34a and the housing of valve 36, thereby making it possible to adjust the position of valve handle 38 with respect to tank 10.

Referring to FIGS. 2A and 2B, there are shown two enlarged fragmentary views, of the end portion of barrel 34. In the embodiment shown in these views, positioning member 40 comprises a length of ⅜ inch channel stock which is fixed to the end of barrel 34 by a weld 41. As shown in FIG. 3, the interior channel 43 defined by member 40 is adapted to fit over and rest on the upper peripheral edge 48 of a rim R. When positioned as shown in FIG. 3, positioning member 40 serves a number of important functions. One of these is to assure that the end of barrel 34 is held in a predetermined radial and axial position with respect to upper bead $B_u$ of tire T. This predetermined position is desirable because it assures a large measure of repeatability in the location from which the discharge pulse is directed at bead $B_u$, thereby facilitating consistently good seating results. Another of these functions is to prevent the end of barrel 34 from shifting out of position during operation, as for example, as a result of the recoil produced by the sudden opening of valve 36. Still another of these functions is to serve as a pivot that allows the angle $\theta$ between the longitudinal axis 34c of barrel 34 and the central axis of tire T to be repeatedly held at the value which provides the best seating action. It will be understood that positioning member 40 need not be a separate element, as shown in FIGS. 1-3. This is because its functions may also be accomplished by grooves cut at appropriate places in the end of barrel 34.

As is best seen in FIG. 2B, the preferred embodiment of the invention includes a barrel 34 having an end portion 46 that has an enlongated shape the longer axis of which is to be aligned in a direction generally tangent to edge 48 of rim R, as shown in FIG. 3. The effect of this shape is to direct the momentum and mass rate of flow associated with the discharge pulse at bead $B_u$ near one edge thereof, preferably at the radial distance $R_B$ (measured with respect to the central axis of the tire) which coincides approximately with the "center of mass" of the bead. This is desirable because it assures that as much momentum as possible is imparted to the bead of the tire and as little as possible is transferred to sidewall SW or rim R. As will be explained more fully in connection with FIG. 6, these conditions are desirable because they assure that the proximal edge of bead $B_u$ is moved downwardly as forcefully as possible, thereby initiating the bead motion which will force the diametrically opposite or distal edge of bead $B_u$ upwardly toward upper bead-seating surface $S_u$. These conditions are also desirable because they simultaneously increase the tire-rim gap so that air from the discharge pulse may be injected into the interior of the tire. Since any energy which is diverted from these actions (such as energy transferred to sidewall SW) is wasted or even counterproductive, such energy is preferably kept to a minimum.

Referring to FIGS. 4A and 4B there are shown alternative configurations for the barrel end structure shown in FIG. 2B, like functioning parts being similarly numbered. FIG. 4A, for example, shows the end 34' of a barrel which is made from rectangular channel stock but which has a flow aperture which is roughly the same size as that of the barrel shown in FIG. 2B. The embodiment of FIG. 4A has the advantage of having an end which is unobstructed by positioning member 40, but the disadvantage that it cannot be connected to a valve with threaded inlet-outlet fittings without a custom made interfacing element. The latter disadvantage may be eliminated, however, if valve 36 is replaced with a valve having a cylindrical valve seat and a cylindrical movable valve element.

FIG. 4B shows the end of a barrel made from rectangular channel stock which has been bent to provide a curvature that matches that curvature of rim edge 48 and which is regarded as having the ability to transfer momentum to bead $B_u$ with the highest possible efficiency, other factors being equal. The embodiment of FIG. 4B differs from those of FIGS. 2B and 4A in that the single piece channel shaped positioning members 40 of the latter are replaced by two smaller positioning elements 40a and 40b each of which has a groove shaped to receive rim edge 48.

Referring to FIG. 3 there are shown cross-sectional views of a tire T and a rim R which are illustrated in the preferred positions which they occupy just prior to the time that the seating tool of the invention is used to initiate seating. In FIG. 3 rim R and tire T are oriented horizontally so that the weight of tire T presses lower bead $B_L$ of the tire against the lower bead-seating surface $S_L$ of the rim. In addition, the tire-rim assembly are arranged so that the lower edge of rim R rests on a rim support block RS which, in turn, rests on the ground. The use of this rim support block is desirable both to immobilize the rim, and thereby prevent it from absorbing momentum from the discharge pulse, and to raise the lower portion of sidewall SW off the ground and thereby prevent it from moving the tire when it snaps into its final position.

In addition, rim R is preferably oriented so that its outer surface is facing upward. One reason that the latter orientation is desirable is that it allows the valve stem 50 of the wheel to be conveniently connected to a source of inflating air through a pneumatic hose 52. Another is that it allows the "long" side 54 of the rim to be positioned near the point of entry of the discharge pulse. The latter position is desirable because it helps to retain more of the air injected into the interior of the tire by the discharge pulse to a greater degree and for a longer time than would be the case if the rim were oriented with its "short" side 56 facing upward. It has been found, for example, that a 24.5 inch tire oriented as shown in FIG. 3 may be seated with a tank pressure of as little as 80 psi, while the same tire having the opposite orientation may require a tank pressure over 100 psi.

While the tire and rim orientations shown in FIG. 3 are preferred because they enable tire T to be seated with air which is compressed to less than the maximum safe operating pressure of tank 10, the seating tool of the present invention has a seating action which is so powerful that it is able to seat a tire in any position, including the vertical, without exceeding the maximum safe operating pressure (125 psi) of tank 10. In such non-horizontal positions, however, it is still desirable to provide a rim support structure such as RS of FIG. 3 in order to immobilize the rim and prevent it from absorbing momentum from the discharge pulse.

The seating action of the present invention will now be described with reference to FIGS. 5 and 6. Of these, FIG. 6 includes six component FIGS. 6A-1 through 6F-1, each of which comprises a simplified cross-sectional side view of the tire and rim which deletes all parts thereof except upper and lower beads $B_u$ and $B_L$ and upper and lower bead seating surfaces $S_u$ and $S_L$. Six such figures have been included in FIG. 6 in order to illustrate the position of bead B with respect to rim R at various stages of the seating process.

In each of FIGS. 6A-1 through 6F-1 beads $B_u$ and $B_L$ are shown as extending radially outward some distance beyond the edges of bead-seating surfaces $S_u$ and $S_L$. This outward extension of the bead reflects the fact that the term "bead" is used herein in its broad sense to refer to not only those portions of the tire having surfaces that rest on the bead-seating surfaces, but also the adjacent relatively thick portions of the tire which connect those portions of the tire to sidewall SW. Such a broad definition is desirable because both of these parts of the tire function and move substantially as a single unit for purposes of the present invention.

FIG. 6 also includes six component FIGS. 6A-2 through 6F-2, each of which comprises a simplified cross-sectional top view of the tire-rim assembly that shows the space within the tire, which space is bounded inwardly by rim R and outwardly by tire T. Six such views have been included in FIG. 6 in order to illustrate the air currents (or pressure waves) that flow inside the tire at the six stages of the seating process shown in FIGS. 6A-1 through FIG. 6F-1, respectively. It will be noted that each of FIGS. 6A-2 through 6F-2 is positioned immediately below FIGS. 6A-1 through 6F-1, respectively, in order to make clear that the overall motion being depicted results both from the momentum imparted to the bead by the impact of the discharge pulse and the air injected into the tire as a result of that impact.

Referring first to FIG. 6A-1 there is shown the bead-rim relationship which exists just prior to the firing of the discharge pulse at bead $B_u$. This relationship is the same as that shown in greater detail in FIG. 3. Under the condition shown in FIG. 6A-1, the only air flowing within the tire is the inflating air which is introduced into the tire via valve stem 50 of FIG. 3. This current is depicted in FIG. 6A-2 by a cluster of short arrows 60 which indicate that this current of air has a small magnitude and flows more or less equally in all directions.

Referring next to FIG. 6B-1 there is shown the bead-rim relationship which exists as the discharge pulse, shown as pulse DP in FIG. 5, reaches its peak value. Under the condition shown in FIG. 6B-1, the proximal edge of bead $B_u$ is shown moving (or swinging) downwardly in response to the impact of discharge pulse DP. At about the same time, depending upon the stiffness of the bead, the distal portion of bead $B_u$ is beginning to move upwardly toward distal portion of seating surface $S_u$. This motion is accompanied by a similar motion of a smaller magnitude in the edges of lower bead $B_L$. As shown in FIG. 6B-2, these conditions are accompanied by the inrush of a high speed current of air 62 that tends to flow in two branches 62a and 62b along the circumference of the interior of the tire. This inrush of air is effectively channeled in the latter direction by the combined effect of a) the tire, which tends to assume a generally funnel shaped configuration near the point of impact of the discharge pulse, and b) the shape of the rim, which tends to direct air diverted from the discharge pulse downwardly and outwardly.

Referring to FIG. 6C-1 there is shown the bead-rim relationship which exists at the instant that the distal portions of the upper and lower beads seat on the distal portions of the bead seating surfaces. This condition occurs in part as a result of the momentum imparted to the distal portions of the bead as a reaction to the impact of the discharge pulse on upper bead $B_u$, and in part as a result of the transient pressure maximum produced as the two branches 62a and 62b air current 62 collide at the distal end of the tire, as shown in FIG. 6C-2. Under the condition shown in FIG. 6C-1, the discharge pulse is still flowing, although its magnitude has diminished substantially, allowing the proximal portion of bead $B_u$ to begin moving upwardly as the energy stored in the sidewall as a result of the impact of the discharge pulse begins to be released. At the same time the distal and proximal portions of lower bead $B_L$ move downwardly and upwardly, respectively, as a further effect of the release of the energy stored in the sidewall and of said pressure maximum.

One additional point of interest with respect to FIG. 6C is that it is not essential to the result contemplated by the present invention that the momentum and pressure induced components of the motion of the distal portion of bead $B_u$ reach their maxima simultaneously. Instead it is sufficient if one maximum occurs shortly before or after the other, thereby allowing for the effect of differences in the bead stiffnesses of different brands and sizes of tires. In any case such differences tend to be minimized by the fact that the flow of air current 62 tends to accelerate tire bead B in the direction in which it is already moving as a result of the impact of the discharge pulse.

Another additional point of interest with respect to FIG. 6C is that the seating of the distal portions of beads $B_u$ and $B_L$ produces a sudden change in the effect of the inflating air introduced through valve stem 50. More particularly, once a portion of the bead seats, inflating air can no longer escape between that part of the bead and rim. Instead, this air is now channeled along the interior of the tire, in the direction of arrows 60a and 60b. This change is beneficial for the completion of the seating process because, as discharge air currents 62a and 62b continue around the interior of the tire toward their point of origin, as shown in FIGS. 6D through 6F, they are reinforced by the inflating air currents 60a and 60b which now act in the same direction. This reinforcing action is significant since it tends to offset the air lost from the discharge air currents by air leaked through the unseated portions of the tire.

A final point of interest with respect to FIG. 6C is that, once the seating of the bead has begun, there is no reason to allow tank 10 to continue to discharge. This is because the air flow comprising this discharge is no longer necessary to complete the seating process and may even oppose the effect of the previously introduced air currents which, as mentioned above, are now flowing back toward their point of origin. The practice of the method of the invention may therefore include the step of reclosing valve 36 shortly after it is opened. This reclosure not only saves energy by saving a portion of the original charge of air, but also makes it possible to use tank 10 as the source of inflating air as well as of the discharge pulse. This may, for example, be accomplished by connecting pneumatic hose 52 to an additional outlet 52a in tank 10 via a suitable pushbutton valve 52b, as shown in dotted lines in FIG. 1A.

Referring to FIGS. 6D-1 and 6D-2 there are shown the bead-rim and air current relationships which exist a short time after the condition shown in FIGS. 6C-1 and 6C-2. Under the condition shown in FIG. 6D-2, the earlier-mentioned transient pressure maximum at the distal edge of the bead has resolved itself into two air currents 62a' and 62b' which flow back toward the proximal edge of the bead. As these air currents flow away from the distal edge of the tire, they force the seating contact between the bead and the rim to progress or propagate around the bead until, at the time show in FIG. 6D-1, the entire left half of the bead has become seated. This progressive seating action results in part from the pressure of air currents 62a' and 62b' and in part from the release of the energy stored in the bead and sidewall by the impact of the discharge pulse. It should be noted that as the seat progresses around the rim, the progressive closure of the tire-rim gap results in the more forceful and efficient channeling of the internal air currents around the interior of the tire.

Referring to FIGS. 6E-1 and 6E-2 there are shown the bead-rim and air current relationships which exist just before the completion of the seating process. Under the condition shown in FIG. 6E, perhaps 90% of the bead has become seated on the rim and the entire force of air currents 62a' and 62b' and the cumulative effect of air currents 60a and 60b is concentrated in the relatively small portion of the bead-rim gap which is still open. It is under this condition that the energy stored in the bead and in the sidewall of the tire become important in completing the seat against the force of the escaping air. Fortunately, the energy stored in the bead and sidewall is also concentrated in the unseated portion of the bead for much the same reason that the energy of a whip is concentrated at its tip. As result, the bead snaps forcefully against the rim, thereby cutting off the escape of air and completing the seating process, i.e., producing the condition shown in FIG. 6F-1. As this occurs, any tendency of the last-seated portion of the bead to bounce off of the rim and re-open a path for the escape of air is offset by the pressure maximum that occurs at the proximal edge of the tire as air currents 62a' and 62b' once again collide, as shown in FIG. 6F-2.

Once the bead has become fully seated, the continued inflow of inflating air through valve stem 50 merely increases the internal pressure within the tire and thereby increases the force with which all parts of the bead are seated on the rim. Thereafter, the conventional steps of disconnecting hose 52, closing off valve 50, etc., are all that is necessary to prepare the wheel for mounting on a hub.

While the foregoing description of the seating action of the present invention has been framed in terms of fast moving currents of air, it could also have been framed in terms of the pressure (or shock) waves that are associated with the leading edges of these currents. If the latter viewpoint is adopted, the head ends of arrows 62a and 62b in FIG. 6 may be visualized as pressure wave fronts and the sites where the "transient pressure maxima" occur may be visualized as the locations where these wave fronts constructively interfere with one another. Under such a view, the significance of the abruptness of the opening of discharge control valve 36 becomes apparent, since it is this abruptness that determines the rise-time or steepness of the leading edge of the discharge pulse. Both aspects of the air flow within the tire have their place in explaining the result produced by present invention, however, since the leading edges of the air currents are thought to be responsible for the ability of these air currents to accelerate the bead toward the rim, while the remainder of the air currents are thought to be responsible for holding the bead in place against the rim once contact has been made.

The above-mentioned features of the air flow produced by the apparatus of the invention are illustrated in FIG. 5. In the latter figure the curve DP', shown in dotted lines, depicts the mass rate of flow of air from barrel 34 as a function of time (the opening of valve 36 occurring at time t=0) when the pneumatic gun of FIG. 1 is fired into the open air. Similarly, solid curve DP depicts the mass rate of flow from barrel 34 as a function of time when the pneumatic gun is fired against the bead of a tire, the lower peak value of curve DP reflecting the effect of the back pressure resulting from the presence of the tire. Both of these curves have leading edges E with a steep slope (fast rise-time) that is related to the rate at which valve 36 is opened and to the dimensions of barrel 34, and an area that is related to the volume and pressure within tank 10. Although the air currents flowing within the tire have magnitudes which are lower than that of pulse DP, due to the diversion of air from the latter, they have a similar overall shape, i.e., a fast-rising leading edge (or shock wave) which is responsible for the acceleration of the bead and a trailing portion which is responsible for holding the bead against the rim. In FIGS. 6A-2 through 6F-2, these features of the discharge pulse are depicted conceptually as the head and body, respectively, of arrows such as 62a and 62b.

In the foregoing discussion it is the effect of the weight of the tire in its horizontal orientation that is responsible for the difference in the positions of the upper and lower beads with respect to their respective bead seating surfaces, as shown in FIG. 6. If the tire has a different (e.g., vertical) orientation, the effect of the weight of the tire will result in a somewhat different positions. In accordance with an important advantage of the present invention, however, all such tire orientations may be accommodated, albeit at different minimum tank pressures. One reason is that the seating action of the present invention is so powerful that the effect of weight-related differences in the configuration of the bead-rim gap are swamped. A more important reason, however, is that the weight of the tire has an essentially static effect while the present invention makes use of primarily dynamic effects. These effects make it possible to "swing" or "rock" the bead into a position in which it can seat by a progressive motion without having to lift the bead all at once against the force of its entire weight. Thus, the present invention makes the seating of a tire substantially independent of its physical orientation.

While the method and apparatus of the invention have been described with reference to a number of specific steps and embodiments, it will be understood that the true spirit and scope of the present invention should be determined only with reference to the appended claims.

What is claimed is:

1. An apparatus for facilitating the seating of the bead of a tubeless tire on a rim comprising, in combination:
   a) a tank for storing a charge of air at a predetermined elevated pressure, said tank having an inlet for connection to a source of compressed air, an outlet, and a volume dependent upon said elevated pressure and on the volume of said tire;
   b) a substantially rigid discharge barrel mounted directly on said tank for conducting a flow of air from said tank through said outlet, said barrel and outlet together defining a discharge path through which said charge of air may be released to initiate the seating of said bead, said barrel defining an internal passage having a cross-sectional area of from approximately 8 to 20 square centimeters;
   c) a valve connected in discharge control relationship to said discharge path, said valve having an internal port with a cross-sectional area roughly equal to the cross-sectional area of said internal passage;
   d) whereby the rapid opening of said valve releases said charge of air as a single pneumatic pulse.

2. The apparatus of claim 1 in which the ratio of the cross-sectional area of said passage to the length of said passage is relatively large, whereby the flow resistance of said discharge path is sufficiently small that the rapid opening of said valve results in the approximately instantaneous release of said charge of air through said barrel.

3. The apparatus of claim 1 in which said barrel is adapted to be positioned so that its longitudinal axis is roughly perpendicular to the plane defined by said bead and so that said pneumatic pulse is directed at said bead, and in which said pressure is sufficiently high that the bead seats on the rim as a result of the combined effect of the momentum transferred to the bead by the leading edge of said pulse and the pressure of the air injected into the tire as a result of the impact of said pulse.

4. The apparatus of claim 1 further including a shut off valve and a pneumatic coupling connected between said source and the inlet of the tank, whereby the apparatus may be disconnected from said source after charging and transported as a self-contained unit.

5. The apparatus of claim 1 including positioning means, located near the end of said barrel and adapted to rest on said rim, for holding said barrel in a predetermined position with respect to said bead during the discharge of the tank.

6. The apparatus of claim 1 including locking means, abutting said valve, for adjusting the angular relationship between the barrel and the tank.

7. The apparatus of claim 1 in which said tank includes a second outlet, smaller than said first outlet, through which inflating air may be applied to the valve stem of the rim.

8. A portable pneumatic gun for facilitating the seating of the bead of a tubeless tire on a rim comprising, in combination:
   a) a tank for storing at elevated pressure a charge of air which, under conditions of standard temperature and pressure, has a volume greater than the internal volume of the tire, said tank having an inlet for connection to a source of compressed air and an outlet;
   b) a substantially rigid conduit mounted directly on said tank, for channeling the flow of air from said tank through said outlet, said conduit and outlet together comprising a barrel through which said charge of air may be fired, said barrel defining an internal flow aperture which is large in relation to the internal flow apertures of general purpose pneumatic hoses;
   c) a valve having an internal flow aperture with an area approximately equal to that of said barrel for initiating the abrupt release of said charge of air through said barrel, said valve being connected in flow controlling relationship to said barrel;
   d) wherein the ratio of the area of the internal flow aperture of said barrel to the length of said barrel is relatively large, whereby the flow resistance of said barrel is sufficiently small that the abrupt opening of said valve results in the approximately instantaneous release of said charge of air through said barrel.

9. The pneumatic gun of claim 8 in which the internal flow aperture of said barrel has an area of from approximately 8 to 20 square centimeters.

10. The pneumatic gun of claim 8 in which said barrel is adapted to be positioned so that air released from said barrel strikes said bead near one, proximal edge thereof, whereby the momentum imparted to the bead and the air injected into the tire as a result of the release of said charge cooperate to cause said bead to seat in a progressive manner beginning at the distal edge thereof.

11. The pneumatic gun of claim 8 further including a shut off valve and pneumatic coupling connected between said source and the inlet of the tank, whereby the gun may be disconnected from said source after charging and transported as a self-contained unit.

12. The pneumatic gun of claim 8 further including positioning means, mounted on said conduit and adapted to rest on said rim, for holding said conduit in a predetermined position with respect to said tire during the release of said charge of air.

13. The pneumatic gun of claim 8 including locking means abutting said valve for fixing the orientation of the conduit with respect to the tank.

14. The pneumatic gun of claim 8 in which said tank includes a second outlet, smaller than said first outlet, through which inflating air may be applied to the inlet valve of the rim.

15. A method for seating the bead of a tubeless tire on a rim including the steps of:
   a) accumulating at elevated pressure, within a predetermined volume, a charge of air which, under conditions of standard temperature and pressure, is larger than that of the interior of the tire;
   b) providing a rigid conduit for channeling the release of said charge of air, said conduit having a closed state and an open state, said conduit defining an internal flow aperture having an area which is sufficiently large in relation to the length of said conduit that the conduit exhibits a flow resistance which allows said charge of air to be released therethrough, approximately instantaneously, as a single pneumatic pulse;
   c) orienting said conduit in proximity to the bead of the tire, near one, proximal edge thereof, so that said pneumatic pulse strikes said proximal edge from a direction approximately perpendicular to the plane defined by said bead; and
   d) establishing the open state of said conduit rapidly enough that said pneumatic pulse has a relatively short rise time;
   e) wherein said elevated pressure and said predetermined volume are sufficiently large that the momentum imparted to the proximal edge of the bead by the impact of said pulse, and the air injected into the tire as a result of the impact of said pulse, are sufficient to initiate a seating motion which begins at the distal edge of the bead and progresses to completion at the proximal edge thereof.

16. The method of claim 15 in which said internal flow aperture has an area of from 8 to 20 square centimeters.

17. The method of claim 15 in which said accumulating step includes the steps of:
   a) providing a tank having an inlet, an outlet and a volume equal to said predetermined volume;
   b) connecting said inlet to a source of compressed air while said conduit is in its closed state;
   c) closing said inlet when said elevated pressure has been reached; and
   d) disconnecting said inlet from said source;
   e) whereby said orienting and establishing steps may be performed at a location remote from said source.

18. The method of claim 15 including the step of introducing into said tire, near the distal edge thereof, prior to said establishing step, a continuous flow of inflating air.

19. The method of claim 18 in which said inflating air is supplied from said charge of air.

* * * * *